United States Patent [19]
Gershen et al.

[11] Patent Number: 5,703,458
[45] Date of Patent: Dec. 30, 1997

[54] CAPACITOR-TYPE MOTOR SPEED CONTROLLER

[75] Inventors: Bernard Gershen, Centerport; Edward Krajci, Franklin Square; Benjamin Neiger, New York, all of N.Y.

[73] Assignee: Leviton Manufacturing Co., Inc., Little Neck, N.Y.

[21] Appl. No.: 490,200

[22] Filed: Jun. 14, 1995

[51] Int. Cl.⁶ .................................................. H02P 5/28
[52] U.S. Cl. .......................... 318/799; 318/798; 318/815; 388/809
[58] Field of Search ............................. 318/798–815; 388/809–815

[56] References Cited

U.S. PATENT DOCUMENTS

| | | |
|---|---|---|
| 3,593,077 | 7/1971 | Loshbough . |
| 3,599,754 | 8/1971 | Caputo et al. . |
| 4,745,539 | 5/1988 | Nilssen . |
| 5,029,265 | 7/1991 | Staats . |
| 5,300,871 | 4/1994 | Bucher et al. ........................ 318/794 |
| 5,323,304 | 6/1994 | Woodworth . |
| 5,563,479 | 10/1996 | Suzuki ................................ 388/809 X |

*Primary Examiner*—Karen Masih
*Attorney, Agent, or Firm*—Paul J. Sutton

[57] ABSTRACT

A quiet motor speed controller is disclosed which varies an amplitude of an AC voltage signal provided from an AC source to drive an AC motor. The controller includes a first impedance in series connection between the source and the motor. A second impedance is electrically connectable with the first impedance in accordance with settings of a switch such that the total impedance interposed between the source and the load is varied by switching. The first and second impedances are substantially defined by first and second capacitive values, preferably including resistive elements to limit current flow at charging and discharging.

7 Claims, 1 Drawing Sheet

CAPACITOR-TYPE MOTOR SPEED CONTROLLER

BACKGROUND OF THE INVENTION

FIELD OF THE INVENTION

The present invention relates to motor speed control and, more particularly, relates to a capacitor-type motor speed controller.

AC motors may be electrically connected directly to an AC source such that AC signals derived therefrom drive the motor at a particular speed. The motor speed may be controlled or adjusted by controlling the amplitude of the AC signal supplied to the motor. For example, if the magnitude of a signal driving the motor at a speed S is reduced by 20%, the motor speed will be reduced by an amount that is substantially linearly related to the 20% reduction in motor drive signal amplitude. The amplitude of the drive signal can be reduced by placing a known impedance (e.g., a resistor) in series with the motor. Further, by switching a known resistance or combination of resistances into and out of the series circuit formed with the motor, the speed of the motor is varied with the switching.

There are drawbacks, however, to attenuating a motor drive signal with a pure resistance in series with the motor. For instance, resistors generate heat in proportion to the voltage induced across them (and the current flowing through them). In addition, at the time of switching, troublesome transients can be generated in various parts of the motor drive circuit which might be better regulated with an impedance which is not purely resistive.

A second known method for varying an amplitude of a motor speed control signal for controlling motor speed includes utilizing a tapped auto transformer or tapped motor windings to control the power delivered to the motor. Inductor based solutions, however, tend to be quite noisy during switching rendering such methods unsuitable for particular applications.

OBJECTS AND SUMMARY OF THE INVENTION

It is therefore an object of the present invention to provide a motor speed controller which overcomes the above-mentioned shortcomings of the prior art.

It is another object of the present invention to provide a motor speed controller which does not rely solely on a resistive element to control attenuation of a signal driving the motor.

It is another object of this invention to provide a motor speed controller which utilizes a variable capacitive reactance in series with the motor to vary the amplitude of a motor speed control signal driving the motor.

It is yet another object of the present invention to provide a motor speed controller which switchingly attenuates the motor drive signal in such a way that motor speed may be switched substantially noiselessly.

Accordingly, the present invention provides a motor speed controller for quietly controlling a speed of an AC motor driven by an AC source. The controller includes a first impedance placed in series with the motor relative to the AC source. A second impedance is preferably included which is electrically connectable to the first impedance. By switchingly controlling the connection between the first and second impedances, the attenuation of the motor drive signal and consequently the motor speed is switchingly controlled.

In a preferred embodiment, the first and second impedances are defined by one or more capacitors which are electrically connected either in parallel or in series. Additional impedances may be combined via switching to provide any reasonable number of switching speeds for AC motor operation. Because of a possibility of large surge currents at switching, a resistor is preferably included in series with each capacitor. In addition, a resistor may be shunted across the capacitor/series resistor combination to limit current during capacitor discharge.

While the invention provides for the switched interconnection of various impedances, e.g., capacitive reactances, with a first impedance to vary the total impedance placed in series to the motor, the invention also envisions switching a first impedance, e.g., a capacitive reactance, into and out of connection with the motor to even more widely vary the amount of the motor drive signal provided across the motor.

The invention also includes a method for controlling the speed of an AC motor driven by an AC source such that minimal audible noise is generated in the speed controller. The method includes selectively interposing a first impedance between the motor and the AC source in order to variably attenuate a motor drive signal provided to drive the motor. A second impedance, which is switchably connectable to the first impedance, may be intermittently electrically connected to the first impedance such that an attenuation of the AC motor drive signal is varied in accordance with the switching such the the motor speed is quietly switched.

Preferably, the first and second impedances include capacitive reactances. The currents charging and discharging the capacitors which define the capacitive reactances are preferably limited by current limiting resistors. Accordingly, very little, if any, audible noise is contributed by the motor speed controller.

IN THE DRAWING FIGURES

DETAILED DESCRIPTION OF THE INVENTION

Figure 1:
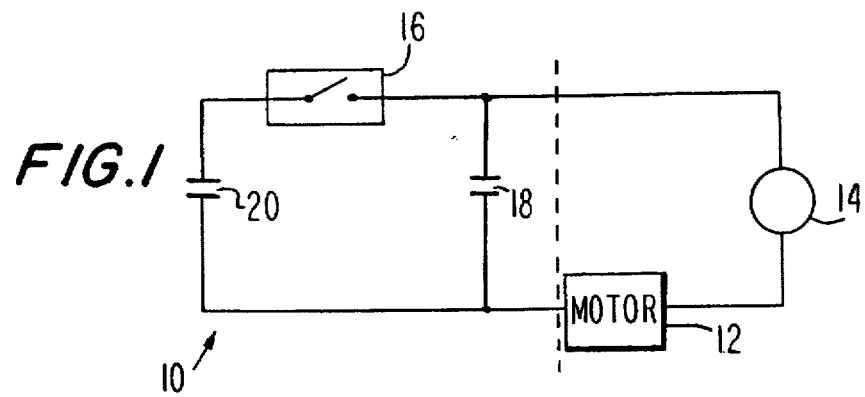
FIG. 1 is a schematic diagram of one embodiment of the present invention.

A first embodiment of a capacitor-type motor speed controller (hereinafter "the controller") 10 of the present invention will now be described with reference to FIG. 1. The controller 10 is shown in the figure electrically connected in series to a motor 12 which is electrically connected to an AC source 14. The source is typically 120-Volt AC source. The controller includes a first capacitor 18 to which a second capacitor 20 is electrically connectable in parallel through a switch 16. The second capacitor 20 is thereby selectively connected in shunt to the first capacitor 18 via switch 16.

When the contact of switch 16 is in the open position, the impedance provided in series with the motor 12 and power supply 14 combination is merely the capacitive reactance of the first capacitor 18 as driven by the AC source 14. When the switch 16 contact is in the closed position, the first and second capacitors 18, 20 are electrically joined in parallel. The total capacitive reactance (i.e., impedance) of the parallel combination 18, 20 is seen by the motor/AC source combination. Such an arrangement changes the magnitude of the drive signal provided through the impedance across the motor. In other words, by switching varying impedances into and out of the circuit, different voltages appear across the motor terminals for varying speed control. Very little, if any, audible noise is emitted from a controller which defines its voltage output thereby, rendering the controller ideal for use with fan speed control motors.

The inventive concept disclosed herein is simple. In order to provide different voltages and therefore different motor speeds, various capacitor combinations are arranged in accordance with one or more switch settings. The impedances formed by the switched capacitive combinations limit the voltage signal impressed across the motor's terminals. The capacitive combinations may be series or parallel connected, depending on the switching.

An inherent problem exists, however, in the controller shown in FIG. 1. At the point of switching, high currents may flow into/out of the capacitors. Such possibility exists because the voltage of the source, as compared to the voltage across the capacitor, at the instant of switch closure is indeterminate rendering indeterminate current which will flow in response to the voltage. High currents generated thereby could be large enough to damage the capacitor(s). For example, assuming that capacitor 20 is discharged with switch 16 open and a peak voltage present across the first capacitor 18. When the switch contact is closed, the second capacitor 20 will be charged with the discharge of first capacitor 18 and the current available through the motor 12. Because there is no current limiting impedance in series with capacitors 18, 20, the charging current can be very high. In particular, if the capacitors are a metallized film construction, the surge current may be enough to damage the capacitors.

The aforementioned problem may be even more acute if the second capacitor 20 is initially charged to a polarity opposite that of first capacitor 18 at switching. Such a case could arise where previous operation charged second capacitor 20 when the switch 16 was closed. When the contact closes, the voltages would add resulting in an even greater surge current flow to establish equilibrium conditions.

Figure 2A:
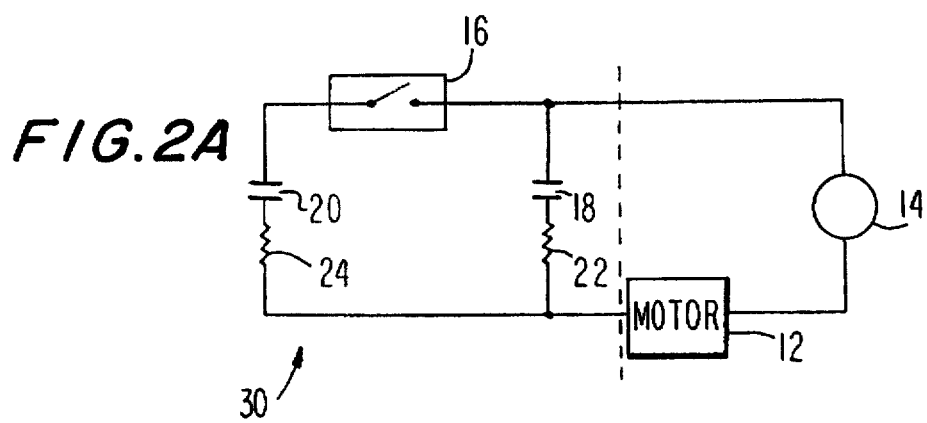
FIG. 2A is a more detailed schematic diagram of the FIG. 1 embodiment.

FIG. 2A shows an embodiment of a controller 30 of the present invention, where a surge current which could flow to charge either of the first or the second capacitors 18, 20 is limited by the addition of first and second resistors 22, 24, electrically connected in series with the first and second capacitors 18, 20, respectively. Because the first and second resistors 22, 24, respectively must be capable of transient high current operation, carbon composition, wirewound or cermet resistors are preferable. The value of the resistors is selectable, by those skilled in the art, based on the steady state load current which will flow in the controller.

Figure 2B:
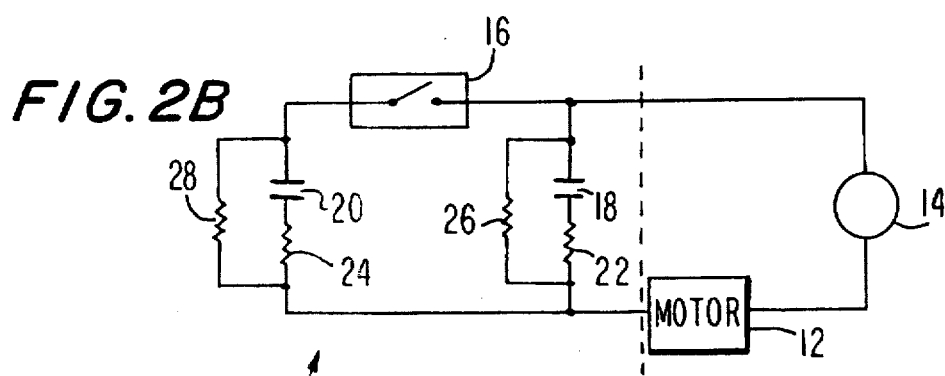
FIG. 2B is a variation on the FIG. 2A embodiment.

FIG. 2B shows an alternative embodiment 30 to the controller of FIG. 2A. Two additional resistors, a third resistor 26 and a fourth resistor 28 are provided to shunt the first capacitor 18/first resistor 22 and the second capacitor 20/second resistor 24 combinations. These third and fourth shunt resistors 26, 28, respectively are included to limit the discharge current flowing from the first and second capacitors 18, 20, respectively when one or the other are switched out of the circuit. This provides two benefits to the controller 30'. First, after the current stored, for example, in second capacitor 20 is discharged through its shunt resistor 28, the maximum voltage available for current flow during equilibrium is equal to the maximum voltage across first capacitor 18 and first resistor 22. Second, a user would not receive an electric shock when removing a controller from service because all residual charge on controller capacitors 18, 20 would be discharged. It should be noted that the third and fourth shunt resistors 26, 28 may be arranged to merely shunt the first and second capacitors 18, 20, respectively, not each of the first capacitor 18/first resistor 22 and second capacitor 20/second resistor 24 combination.

Figure 3:
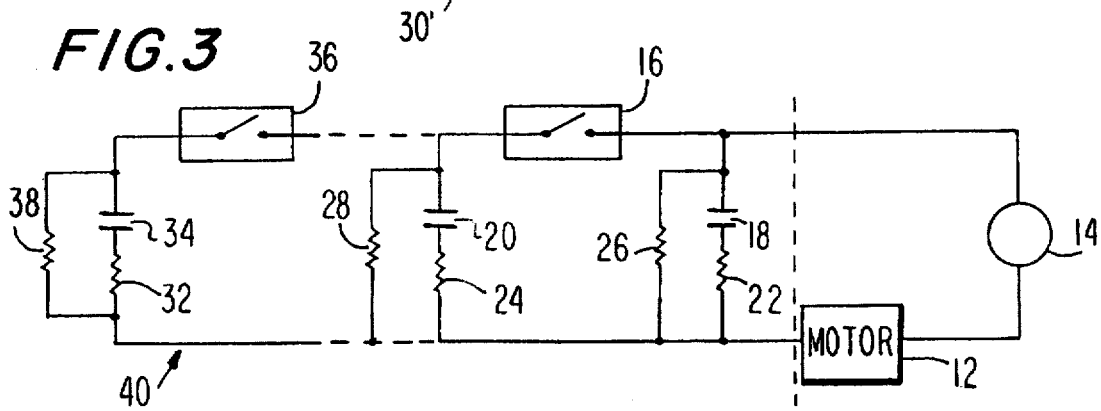
FIG. 3 is a schematic diagram of an alternative embodiment of the invention.

FIG. 3 is an embodiment of an controller 40 of the present invention in which a number of additional switches, such as switch 36, are included for switching additional capacitors, such as $N^{th}$ capacitor 34, into the controller circuit to further vary the impedance provided in series with the motor 12. Such an arrangement could theoretically provide unlimited switchable variations on a maximum speed defined by the maximum power supply potential.

It is clear that the above description of the preferred embodiment in no way limits the scope of the present invention which is defined by the following claims.

What is claimed is:

1. A method for controlling the speed of an AC motor driven by an AC source such that minimal audible noise is generated at switching motor speeds, comprising the steps of:
   a) connecting an AC motor in series with an AC source;
   b) interposing a first impedance comprising a first capacitor in series with a first resistor, in series with said AC motor and said AC source to establish a first AC motor speed; and
   c) selectively interposing a second impedance comprising a second capacitor in series with a second resistor in parallel with said first impedance to establish a second AC motor speed, less than said first AC motor speed.

2. The method defined by claim 1, wherein said first impedance further comprises a third resistor in parallel with said first capacitor and said first resistor and said second impedance further comprises a fourth resistor in parallel with said second capacitor and said second resistor to limit a current which flows from said first and second capacitors during discharge.

3. A method for controlling the speed of an AC motor driven by an AC source such that minimal audible noise is generated at switching motor speeds comprising the steps of:
   a) connecting an AC motor in series with an AC source;
   b) interposing a first impedance comprising a first capacitor in series with a first resistor, in series with said AC motor and said AC source to establish a first AC motor speed;
   c) selectively interposing second through N impedances each comprising a capacitor and a resistor in series in parallel with said first impedance, to vary the speed of said AC motor.

4. A motor speed controller for quietly controlling the speed of an AC motor driven by an AC source, comprising:
   a) a first impedance comprising a first capacitor in series with a first resistor electrically connected in series with said AC motor and said AC source to establish a first AC motor speed;
   b) a second impedance comprising a second capacitor in series with a second resistor adapted to be selectively electrically connectable in parallel with said first impedance to establish a second AC motor speed, less than said first AC motor speed; and
   c) switch means between said first and second impedances for selectively connecting said second impedance in parallel with said first impedance to vary the drive signal provided by said AC source to drive said AC motor.

5. The motor speed controller as defined by claim 4, wherein said first and second impedances further comprise a resistor in parallel connection with each of said first and second impedances.

6. A motor speed controller for controlling the speed of an AC motor driven by an AC source such that minimal audible noise is generated at switching motor speeds, comprising:

a) a first impedance comprising a first capacitor in series with a first resistor electrically connected in series with said AC motor and said AC source to establish a first AC motor speed;

b) second through N impedances, each comprising a capacitor in series with a resistor and arranged to be placed in parallel with said first impedance; and c) N-1 switching means each connected between two adjacent impedances in sequential order to decrease the AC signal applied to said AC motor and cause said motor to operate at a lesser speed.

7. A motor speed controller as defined in claim 6 wherein each of said first and said second through N impedances has an additional resistor connected in parallel therewith.

\* \* \* \* \*